(12) United States Patent
Lee et al.

(10) Patent No.: US 7,483,093 B2
(45) Date of Patent: Jan. 27, 2009

(54) FLAT FLUORESCENT LAMP CAPABLE OF REDUCING PINHOLE FORMATION

(75) Inventors: Yong-Woo Lee, Gyeonggi-do (KR); Hea-Chun Lee, Gyeonggi-do (KR); Jae-Sang Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 287 days.

(21) Appl. No.: 11/506,735

(22) Filed: Aug. 18, 2006

(65) Prior Publication Data

US 2007/0040961 A1    Feb. 22, 2007

(30) Foreign Application Priority Data

Aug. 19, 2005  (KR) .................. 10-2005-0075994

(51) Int. Cl.
G02F 1/1335   (2006.01)
F21V 7/04     (2006.01)
H01K 1/58     (2006.01)

(52) U.S. Cl. .................. 349/70; 349/56; 349/112; 349/158; 349/164; 362/614; 362/260; 313/13; 313/33; 313/45; 313/493

(58) Field of Classification Search ............ 349/70, 349/56, 112, 158, 164, 190; 362/614, 218, 362/260, 373; 313/33, 13, 44, 45, 46, 493
See application file for complete search history.

(56) References Cited

U.S. PATENT DOCUMENTS

| | | | | |
|---|---|---|---|---|
| 5,798,566 A | * | 8/1998 | Sato et al. | 257/712 |
| 6,787,981 B2 | * | 9/2004 | Yoo et al. | 313/491 |
| 6,897,602 B2 | * | 5/2005 | Son | 313/45 |
| 2005/0122048 A1 | * | 6/2005 | Kang et al. | 313/635 |
| 2006/0044821 A1 | * | 3/2006 | Lee et al. | 362/559 |
| 2006/0181193 A1 | * | 8/2006 | Park et al. | 313/493 |
| 2007/0040961 A1 | * | 2/2007 | Lee et al. | 349/70 |
| 2007/0132361 A1 | * | 6/2007 | Chung et al. | 313/493 |

* cited by examiner

*Primary Examiner*—Brian M Healy
(74) *Attorney, Agent, or Firm*—MacPherson Kwok Chen & Heid LLP (57) ABSTRACT

A flat fluorescent lamp includes a first substrate, a second substrate, an external electrode, and a radiating member. The second substrate is combined with the first substrate to form a plurality of discharge spaces. The external electrode is formed on at least one surface of the first substrate and the second substrate, wherein the external electrode extends perpendicularly to the discharge spaces. The radiating member is formed on the external electrode and radiates heat generated from the external electrode. Therefore, the heat generated from the flat fluorescent lamp is radiated to outside the flat fluorescent lamp through the radiating member, reducing pinhole formation and generally improving luminance characteristics of the flat fluorescent lamp.

18 Claims, 6 Drawing Sheets

FLAT FLUORESCENT LAMP CAPABLE OF REDUCING PINHOLE FORMATION

CROSS-REFERENCE TO RELATED APPLICATIONS

This application relies for priority upon Korean Patent Application No. 2005-75994 filed on Aug. 19, 2005, the content of which is herein incorporated by reference in its entirety.

BACKGROUND OF THE INVENTION

1. Field of the Invention

The present invention relates generally to a flat fluorescent lamp and more particularly to a flat fluorescent lamp capable of reducing a pinhole such that a backlight assembly having the flat fluorescent lamp demonstrates improved heat-radiating properties.

2. Description of the Related Art

Generally, a liquid crystal display (LCD) device is a display device that displays an image using liquid crystals that have optical and electrical properties, such as an anisotropic refractive index, an anisotropic permittivity and so on. Compared to other display devices such as a cathode ray tube (CRT), a plasma display panel (PDP), etc., LCD devices have advantages such as thinness, light weight, low driving voltage, low power consumption and so on. Therefore, LCD devices are widely used in various industrial fields.

The LCD device is a non-emissive display device that cannot emit light for itself. Accordingly, the LCD device requires a backlight assembly to provide an LCD panel with light.

A conventional backlight assembly generally uses a cold cathode fluorescent lamp (CCFL) having a thin and long cylindrical shape as a light source. However, as an LCD device becomes larger in size, more and more CCFLs are needed, increasing the manufacturing cost and degrading the overall luminance uniformity.

Recently, a flat fluorescent lamp that generates planar light has been invented to overcome the above-mentioned problems. A flat fluorescent lamp includes a plurality of discharge spaces for uniformly emitting light over a wide area, and electrodes driving the flat fluorescent lamp. The electrodes are disposed at end portions of the discharge spaces and contact the discharge spaces.

In the flat fluorescent lamp, plasma discharge arises to generate ultraviolet rays in the discharge spaces in response to receiving a discharge voltage from an inverter. Then, a fluorescent material formed on the inside of the flat fluorescent lamp is excited by the ultraviolet rays caused by the plasma discharge, and visible rays are emitted.

When the temperature of the flat fluorescent lamp reaches about 160° C., a pinhole phenomenon occurs, whereby a hole forms in the glass. The pinhole phenomenon negatively affects the stability of the flat fluorescent lamp.

SUMMARY OF THE INVENTION

The present invention provides a flat fluorescent lamp capable of removing a pinhole phenomenon. The present invention also provides a backlight assembly having the above-mentioned flat fluorescent lamp. The present invention also provides a liquid crystal display (LCD) device having the above-mentioned flat fluorescent lamp.

In one aspect, the present invention is a flat fluorescent lamp that includes a first substrate, a second substrate, an external electrode, and a radiating member. The second substrate is combined with the first substrate to form a plurality of discharge spaces between the first substrate and the second substrate. The external electrode is formed on at least one surface of the first substrate and the second substrate, and extends in a direction that is substantially perpendicular to the length of the discharge spaces. The radiating member is formed on the external electrode and radiates heat from the external electrode.

In another aspect, the invention is a backlight assembly that includes a receiving container, a flat fluorescent lamp, and a radiating layer. The flat fluorescent lamp is in the receiving container and includes a plurality of discharge spaces where light is generated. The radiating layer is formed between the flat fluorescent lamp and the receiving container to radiate heat generated from the flat fluorescent lamp.

In yet another aspect, the invention is an LCD device that includes the above-described backlight assembly and a display unit. The display unit includes a liquid crystal display panel displaying an image using the light generated from the backlight assembly and a driving circuit part that drives the liquid crystal display panel.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
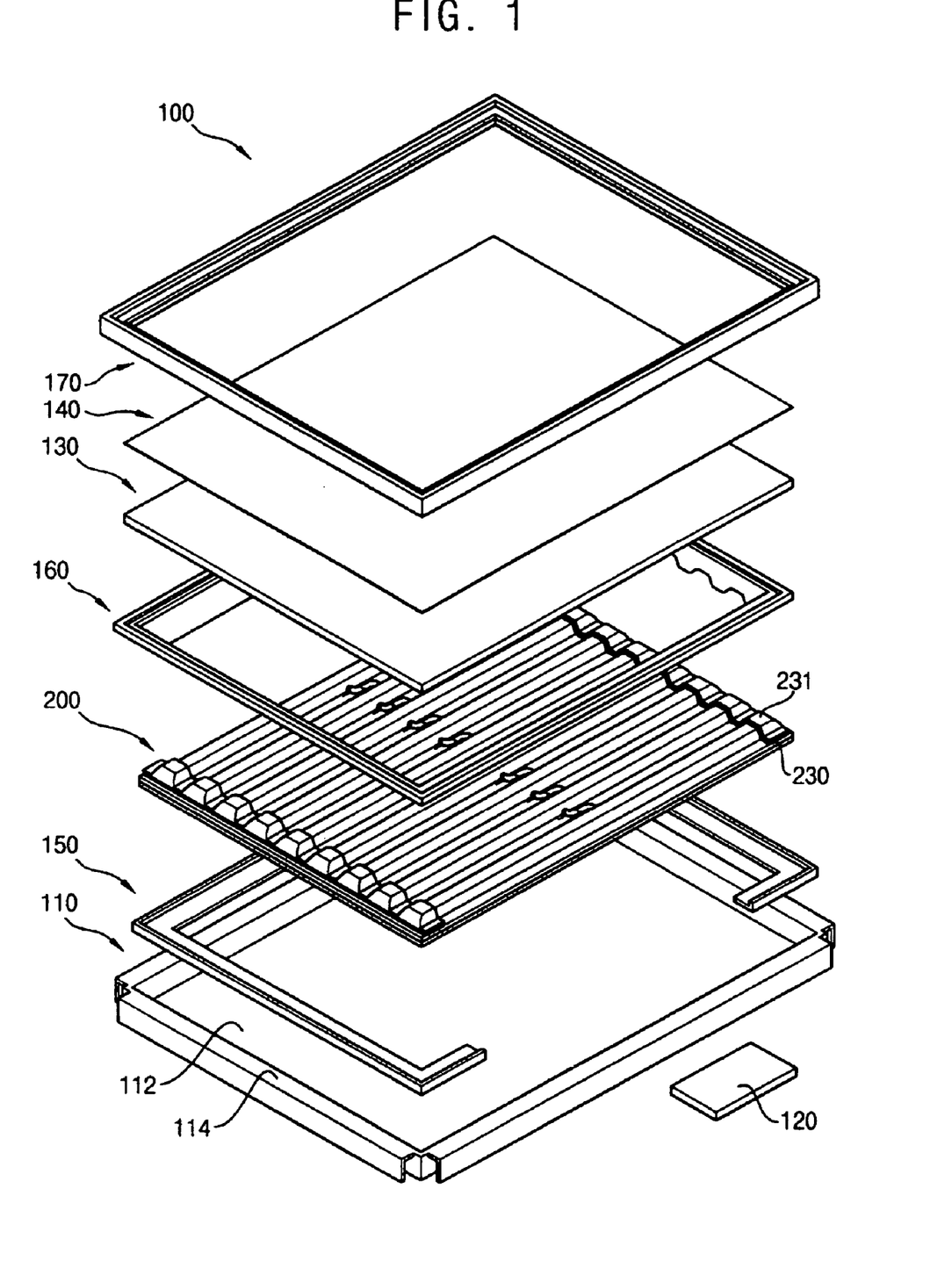
FIG. 1 is an exploded perspective view illustrating a backlight assembly according to an embodiment of the present invention.
Figure 2:
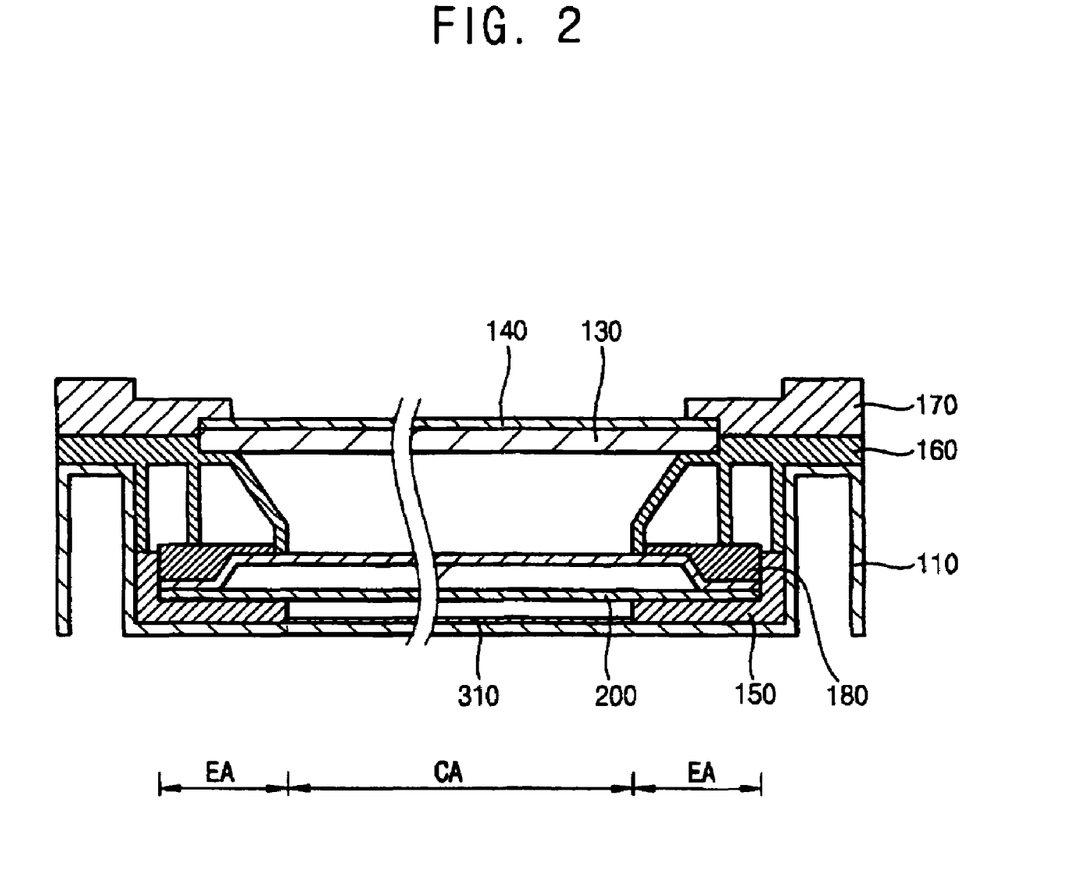
FIG. 2 is a cross-sectional view illustrating the backlight assembly in FIG. 1.

FIG. 1 is an exploded perspective view illustrating a backlight assembly according to an embodiment of the present invention, and FIG. 2 is a cross-sectional view illustrating the backlight assembly in FIG. 1.

Referring to FIGS. 1 and 2, a backlight assembly 100 includes a receiving container 110 and a flat fluorescent lamp 200.

The receiving container 110 has a bottom portion 112 and a side portion 114 that extends from the edge portions of the bottom portion 112 to form a receiving space for the flat fluorescent lamp 200. The side portion 114 may have a folded structure having a U-shaped cross-section to provide a combining space and improve coherence. The receiving container 110 may be made of a metal that has superior strength such that it is not easily deformed.

The flat fluorescent lamp 200 is disposed in the receiving space of the receiving container 110. The flat fluorescent lamp 200 includes a plurality of discharge spaces spaced apart from each other. When viewed from the top ("top" being in reference to FIG. 1), the flat fluorescent lamp 200 has a quadrilateral shape that enables it to emit planar light.

In the flat fluorescent lamp 200, plasma discharge occurs in the discharge space in response to a discharge voltage from a power supply part 120. The flat fluorescent lamp 200 transforms ultraviolet rays caused by the plasma discharge into visible rays, which are emitted. The flat fluorescent lamp has its internal space divided into a plurality of discharge spaces to improve luminescence efficiency and light uniformity.

The backlight assembly 100 further includes a power supply part 120 that supplies the flat fluorescent lamp 200 with power.

The power supply part 120 is disposed at a rear surface of the receiving container 110. The "rear" surface refers to the bottom surface in FIG. 1. The power supply part 120 boosts a low alternating voltage provided from an external device (not shown) through a power line (not shown) to a high alternating voltage in order to drive the flat fluorescent lamp 200, and then provides the flat fluorescent lamp 200 with the high alternating voltage to emit light.

The power supply part 120 may include a PCB. Alternatively, the power supply part 120 may have a separate structure that includes a PCB outputting driving power to drive the flat fluorescent lamp 200 and another PCB outputting driving power to drive the PCB.

The backlight assembly 100 may further include a diffusing plate 130 disposed on the flat fluorescent lamp 200 and optical sheets 140 disposed on the diffusing plate 130.

The diffusing plate 130 diffuses the light coming from the flat fluorescent lamp 200 to improve luminance uniformity. The diffusing plate 130 is a plate having a predetermined thickness, and is spaced apart from the flat fluorescent lamp 200 by a set distance. The diffusing plate 130 is made of a transparent material to transmit the light, and includes a dispersant to diffuse the light. The diffusing plate 130 may be made of, for example, polymethyl methacrylate (PMMA).

The optical sheets 140 guide the diffused light in a path that improves luminance when viewed from the front of the backlight assembly 100. The "front" refers to the top of the view in FIG. 1. The optical sheets 140 may further include a prism sheet to guide the diffused light that has passed through the diffusion plate 130 to improve the luminance when viewed from the front. Also, the optical sheets 140 may include a diffusing sheet for diffusing the light from the diffusing plate 130 once more, further enhancing luminance uniformity.

In addition, the optical sheets 140 may further include a reflective polarizing sheet that transmits a portion of the light that satisfies a particular condition and reflects the remaining portion of the light, to improve the luminance. The optical sheets 140 may further include optical sheets that perform various functions according to the required luminance characteristics. Alternatively, some of the sheets may be removed from the optical sheets 140 of the backlight assembly if desired.

The backlight assembly 100 may further include a buffer member 150 disposed between the flat fluorescent lamp 200 and the receiving container 110 to support the peripheral portion of the flat fluorescent lamp 200.

The buffer member 150 contacts the peripheral portion of the flat fluorescent lamp 200, and the flat fluorescent lamp 200 is spaced apart from the receiving container 110 by the buffer member 150 to prevent electrical contact between the flat fluorescent lamp 200 and the receiving container 110, which contains a metal.

The buffer member 150 includes an elastic material that absorbs an impact from outside the backlight assembly 100. Examples of the elastic material that can be used for the buffer member 150 include silicone, synthetic resin, etc., which insulate and buffer the flat fluorescent lamp 200.

The buffer member 150 may include two pieces having a U-shape. Alternatively, the buffer member 150 may include four straight pieces corresponding to four sides of the flat fluorescent lamp 200, or four bent pieces corresponding to four corners of the flat fluorescent lamp 200. The buffer member 150 may also be integrally formed as a single-piece frame.

The backlight assembly 100 may further include a first mold 160. The first mold 160 is disposed between the flat fluorescent lamp 200 and the diffusing plate 130.

The first mold 160 fixes the peripheral portion of the flat fluorescent lamp 200 to the receiving container 110 through the buffer member 150, and supports the peripheral portion of the diffusing plate 130. The first mold 160 blocks an electrode area (EA) of the flat fluorescent lamp 200. Almost no light is transmitted through the electrode area (EA) of the flat fluorescent lamp 200, as light passing through the electrode area (EA) would form a dark portion adjacent to the sides of the backlight assembly 100.

In FIGS. 1 and 2, the first mold 160 is integrally formed as a single-piece frame. Alternatively, the first mold 160 may include two pieces having a substantially U-shape or a substantially L-shape. The first mold 160 may further include four straight pieces corresponding to four sides of the flat fluorescent lamp 200.

The backlight assembly 100 may further include a second mold 170 disposed on the first mold 160 to fix the peripheral portion of the diffusing plate 130 and the peripheral portion of the optical sheets 140 to the first mold 160.

The second mold 170 may also be integrally formed as a single-piece frame. Alternatively, two or four pieces that may be assembled to form the second mold 170.

The backlight assembly 100 may further include a heat-radiating pad 180 in the electrode area (EA) of the flat fluorescent lamp 200. An external electrode 230 is formed in the electrode area (EA). Partly due to the external electrode 230, heat generated from the electrode area (EA) is greater than heat generated from the remaining area of the flat fluorescent lamp 200, and the heat-radiating pad 180 radiates the heat generated from the electrode area (EA), thereby improving luminance uniformity of the backlight assembly 100.

Figure 3:
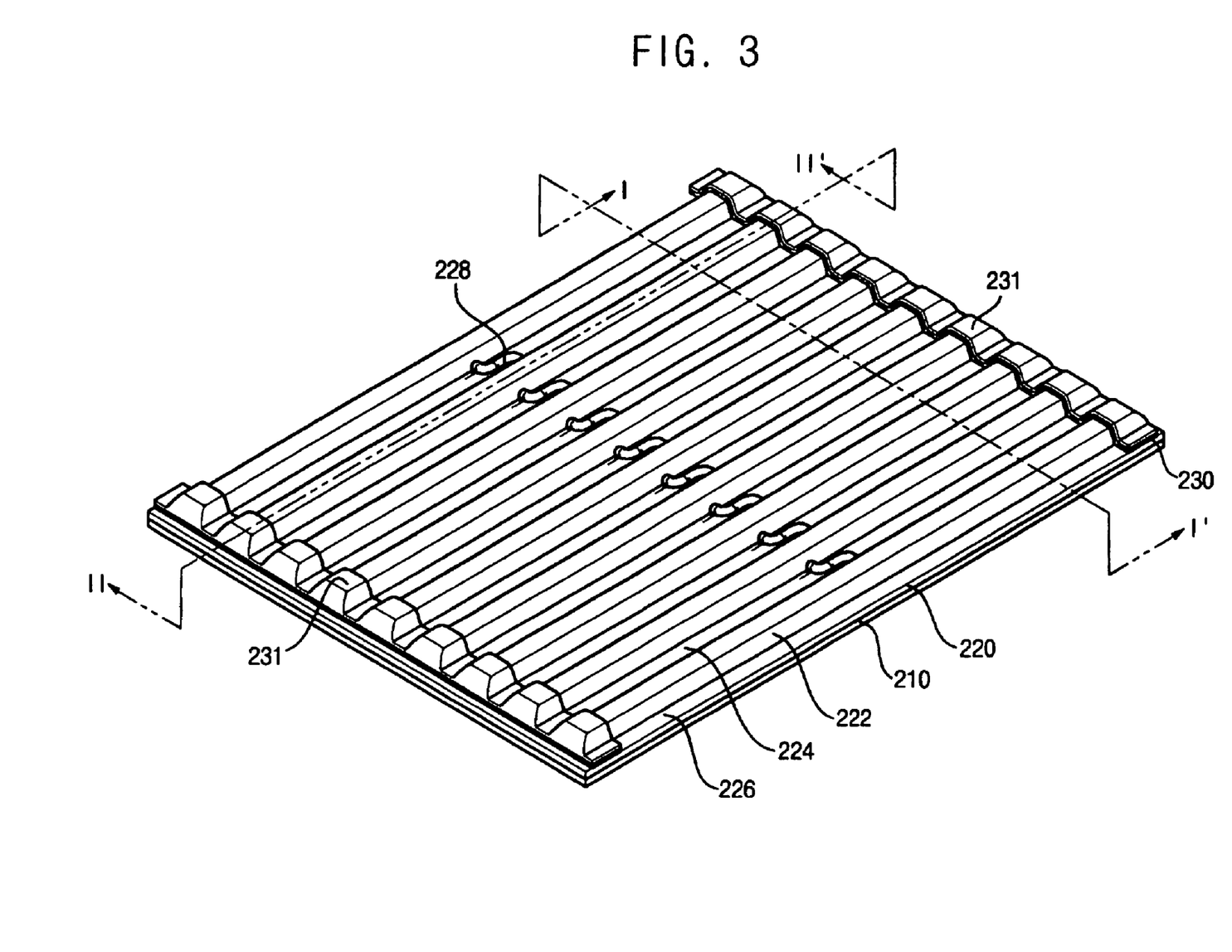
FIG. 3 is a perspective view illustrating the flat fluorescent lamp in FIG. 1.
Figure 4:
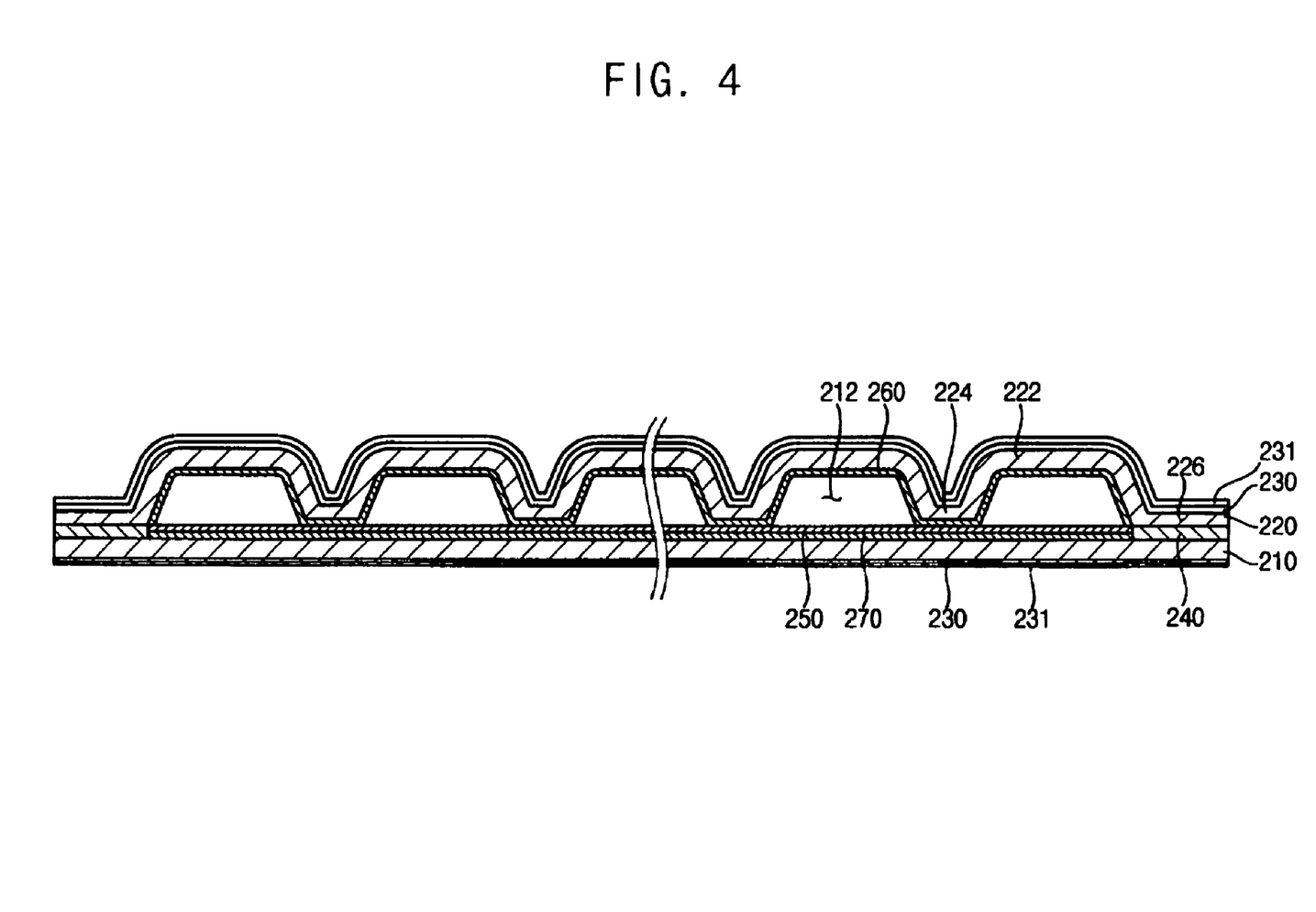
FIG. 4 is a cross-sectional view taken along the line I-I' in FIG. 3.
Figure 5:
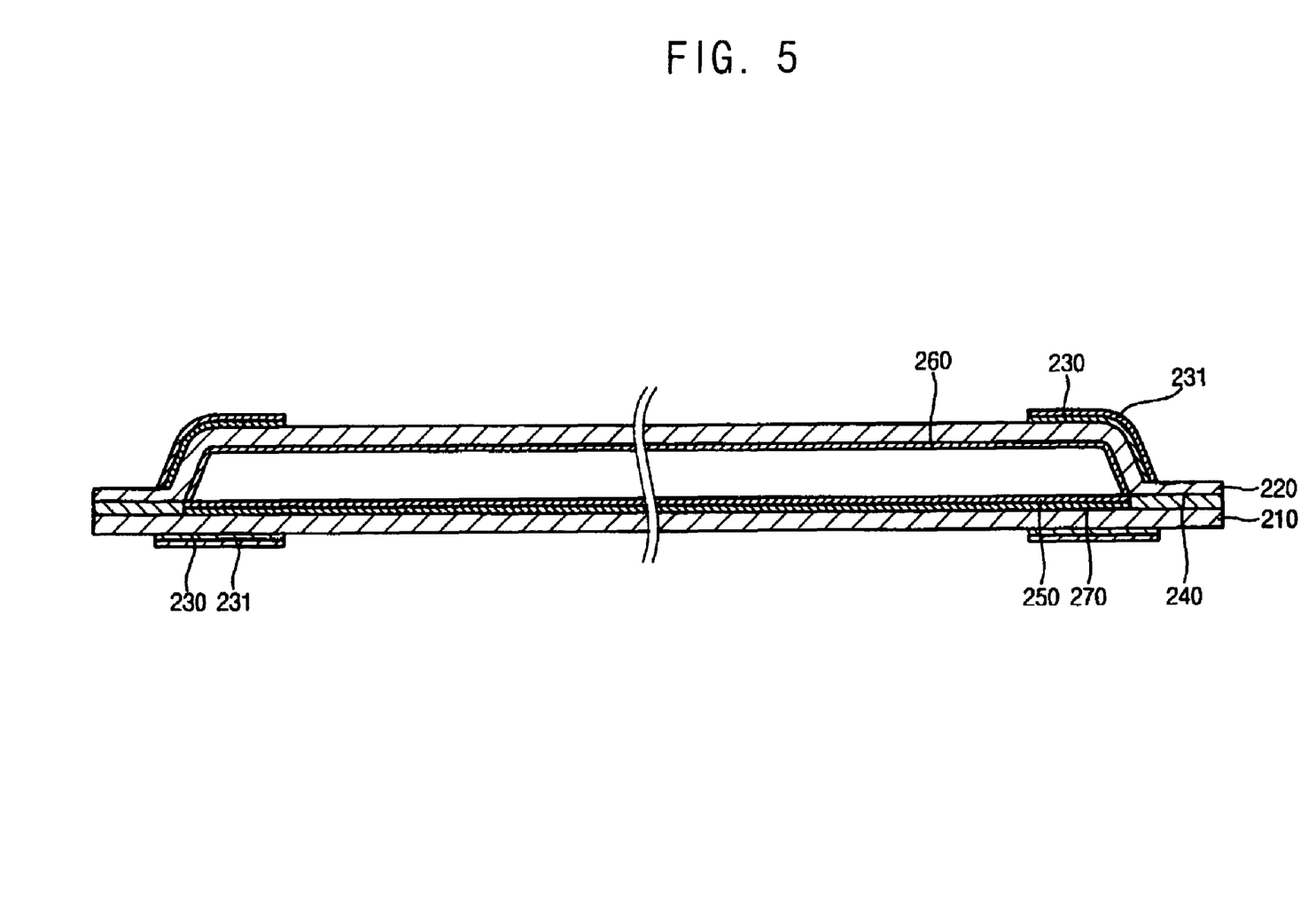
FIG. 5 is a cross-sectional view taken along the line II-II' in FIG. 3.

FIG. 3 is a perspective view illustrating the flat fluorescent lamp in FIG. 1. FIG. 4 is a cross-sectional view taken along the line I-I' in FIG. 3. FIG. 5 is a cross-sectional view taken along the line II-II' in FIG. 3.

Referring to FIGS. 3, 4 and 5, the flat fluorescent lamp 200 includes a lower substrate 210, an upper substrate 220 combined with the lower substrate 210 to form a plurality of discharge spaces 212, an external electrode 230 to apply electrical power to the discharge spaces 212, and a radiating member 231 to reduce the temperature of the external electrode 230.

The lower substrate 210 has a substantially quadrilateral plate shape. The lower substrate 210 may include a glass substrate.

The upper substrate 220 is formed through a molding process to form the discharge spaces 212. The upper substrate 220 includes a transparent material to transmit light generated from the discharge spaces 212. For example, the upper substrate 220 may include a glass substrate.

The molding process of the upper substrate 220 may be performed by various methods. With one method, a glass substrate having a substantially flat shape, similar to the lower substrate 210, is heated, and the lower substrate 210 is pressed by a mold through a molding process to form the upper substrate 220. With another method, the upper substrate 220 may be formed through a blow molding process. In the blow molding process, the glass substrate having a substantially flat shape like that of the lower substrate 210, is molded by air blowing to form the upper substrate 220.

The upper substrate 220 may be divided into a plurality of discharge space portions 222, a plurality of space-dividing portions 224, and a sealing portion 226. The discharge space portions 222 are spaced apart from the lower substrate 210 to form the discharge spaces 212. The space-dividing portions 224 make contact with the lower substrate 210 between the discharge space portions 222, defining the discharge spaces 212. The sealing portion 226 is combined with the lower substrate 210 at a peripheral portion of the upper substrate 220.

In FIG. 4, each of the discharge space portions 222 have a substantially arch-shaped cross-section and the neighboring discharge space portions 222 are spaced apart from each other at a predetermined distance while sharing a continuous surface. Depending on the embodiment, the upper substrate 220 may have a substantially semicircular cross-section, a substantially quadrangular cross-section, a substantially trapezoidal cross-section, etc.

A connecting pathway 228 is formed on the upper substrate 220 to connect adjacent discharge spaces 212. The connecting pathway 228 is formed in each of the space-dividing portions 224. In another embodiment, a plurality of connecting pathways may be formed in a space-dividing portion. The connecting pathway 228 provides a pathway through which air is discharged from the discharge spaces 212 or through which a discharge gas is injected into the discharge spaces 212.

The connecting pathways 228 may be formed through the molding process at the same time the upper substrate 220 is formed. The connecting pathway 228 may have various shapes to connect the adjacent discharge spaces 212. For example, the connecting pathway 228 may have a curved structure of a substantially S-shape. When the connecting pathway 228 has an S-shape, a path length of the discharge gas between the adjacent discharge spaces 212 is increased to decrease drifting of the discharge gas between the adjacent discharge spaces 212.

The lower substrate 210 is combined with the upper substrate 220 through a binding member 240. The binding member 240 may include frit, which is a mixture of glass and metal. Frit has a lower melting point than pure glass.

The binding member 240 is disposed between the lower substrate 210 and the upper substrate 220 to overlap the sealing portion 226, and combines the lower substrate 210 with the upper substrate 220. The binding member 240 disposed between the lower substrate 210 and the upper substrate 220 is melted by externally provided heat, and the molten binding member 240 combines the lower substrate 210 with the upper substrate 220.

After combining the lower substrate 210 with the upper substrate 220, the air in the discharge spaces 212 is exhausted to form a vacuum in the discharge spaces 212. After the air is exhausted, the discharge gas is injected into the discharge spaces 212. The discharge gas includes various gases for plasma discharge in the discharge spaces 212, such as mercury (Hg), neon (Ne), or argon (Ar), among others. These can be used alone or in different combinations.

The space-dividing portions 224 of the upper substrate 220 is closely adhered to the lower substrate 210 due to a pressure difference between the discharge spaces 212 and the area surrounding the flat fluorescent lamp 200. For example, the pressure of discharge gas in the discharge spaces 212 is from about 50 torr to about 70 torr, and the external atmospheric pressure is about 760 torr. Therefore, the pressure difference between the discharge spaces 212 and the exterior of the flat fluorescent lamp 200 generates a force toward the inside of the flat fluorescent lamp 200. This force combines the space-dividing portions 224 with the lower substrate 210.

The external electrode 230 is formed on at least one surface of the lower substrate 210 and the upper substrate 220. The external electrode 230 is formed on each of the end portions of the discharge spaces 212 and extends in a longitudinal direction. The external electrode 230 crosses the discharge spaces 212 to apply a driving power to the discharge spaces 212.

Two external electrodes 230 may be formed. One of the external electrodes 230 is on the lower substrate 210 and the other one of the external electrodes 230 is on the upper substrate 220. When two external electrodes 230 are formed on the lower substrate 210 and the upper substrate 220, the external electrodes 230 may be electrically connected to each other through a connecting member such as a conductive clip (not shown).

The external electrode 230 includes an electrically conductive material and receives driving power from an external power supply part. For example, the external electrode 230 may include a silver paste that is a mixture of silver (Ag) and silicon oxide ($SiO_2$). Alternatively, the external electrode 230 may include a metal or metal mixture. As yet another alternative, the external electrode 230 may be performed through various methods such as spray method, spin coating method, dipping method, etc. In addition, the external electrode 230 may include a metal socket.

In FIGS. 3 to 5, the flat fluorescent lamp includes the flat lower substrate and the upper substrate that includes discharge spaces formed by the molding process. Alternatively, the flat fluorescent lamp may include a flat lower substrate, a flat upper substrate, and a plurality of partition walls interposed between the lower and upper substrates to form discharge spaces between the lower and upper substrates.

The radiating member 231 is formed on the external electrode 230. The radiating member 231 protects the external electrode 230, and also electrically insulates the external electrode 230 from elements outside the flat fluorescent lamp 200. In addition, the radiating member 231 helps dissipate the heat or infrared rays generated from the external electrode 230 to an area outside the flat fluorescent lamp 200. The radiating member 231 includes a material that has high thermal emissivity. In order to reduce the temperature of the external electrode 230, the radiating member 231 may include aluminum oxide ($Al_2O_3$) or a ceramic paint including "Cerac α" (a product co-developed by Oki Electric and Ceramission Co., Ltd. of Japan), among others. "Cerac α" has a thermal emissivity of about 0.96 at a temperature of about 100° C., and may be formed as a thin film having a thickness of about 100 μm.

The radiating member 231 may also include a ceramic material. The thermal emissivity of the ceramic material in a coating film of the radiating member 231 is about 0.96. The radiating member 231 may be coated on the external electrode 230. Alternatively, the radiating member 231 may be attached to the external electrode 230 in a form of a separate sheet. Also, the radiating member 231 may be formed by dipping the flat fluorescent lamp 200 in a liquefied ceramic material. The materials mentioned above as being appropriate for the radiating member 231 are exemplary rather than exhaustive, and numerous other materials may be included in the radiating member 231.

In FIGS. 3 to 5, heat emanates from the radiating member 231. The radiation does not require an intervening medium to transfer the heat, and instantly transfers the heat from a high-temperature body to a low-temperature body at the speed of light. Radiation transfers heat faster than convection or conduction. Therefore, heat is rapidly removed from the external electrode 230 through the radiating member 231 that is formed on the external electrode 230.

The radiating member 231 may also be formed on a portion of the external electrode 230 to radiate the heat. In particular, the radiating member 231 may be formed on the external electrode 230 formed on only one side of the upper substrate 220, on a portion of the lower substrate 210, or on a portion of the upper substrate 220. Alternatively, the radiating member 231 may be formed on the first mold 160 (shown in FIG. 1) to dissipate the heat generated from the external electrode 230. The radiating member 231 may be formed on different portions of the flat fluorescent lamp 200, depending on the embodiment. It should be noted that the scope of the present invention is not limited by the above or below embodiments as shown or described.

Table 1 shows simulation results related to a heat-radiating effect of a radiating member according to the present invention.

In Table 1, a ceramic material was coated on a receiving container 110 of the backlight assembly to form a radiating member 231, and the amount of heat generated through conduction, convection and radiation was measured.

TABLE 1

| Case | Thermal Conductivity Heat-radiating pad | Thermal Emissivity | | Amount of Heat [Watt] | | | Ratio of Heat Generated from Rear Surface of Lamp [%] | |
|---|---|---|---|---|---|---|---|---|
| | | B/C in | B/C out | Conduction | Convection | Radiation | Total | Increment |
| A0 | 1.75 | 0.03 | 0.03 | 15.29 | 33.17 | 3.36 | 52.41 | Reference |
| A1 | 1.75 | 0.96 | 0.03 | 13.03 | 23.17 | 21.19 | 58.04 | 5.63 |
| A2 | 1.75 | 0.03 | 0.96 | 15.96 | 37.75 | 3.75 | 58.12 | 5.71 |
| A3 | 1.75 | 0.96 | 0.96 | 13.97 | 26.58 | 23.91 | 65.20 | 12.79 |

Referring to Table 1, the amount of heat removed was measured when the flat fluorescent lamp 200 included a conventional heat-radiating pad or a ceramic layer that was formed on the receiving container 110 as the radiating member 231.

The external electrode 230 was formed on the flat fluorescent lamp 200, which was then combined with the receiving container 110. The ceramic material was formed on the inside and the outside of the receiving container 110 in the area corresponding to the external electrode 230.

A0, A1, A2, and A3 designate different embodiments of the backlight assembly 100. In Case A0, there was ceramic material coating on the receiving container 110. In Case A1, the ceramic material was coated only on the inside of the receiving container 110. In Case A2, the ceramic material was coated only on the outside of the receiving container 110. In Case A3, the ceramic material was coated on both the inside and the outside of the receiving container 110.

In Case A0, where the ceramic material was not coated on the inside or the outside surface of the receiving container 110, the amount of heat radiated by the radiating member 231 was less than the amount of the heat removed from the radiating member 231 by conduction or convection. The total amount of heat radiated, conducted and convected from the receiving container 110 was about 52.41 watts.

In Case A1, where the ceramic material was coated only on the inside surface of the receiving container 110, the amount of heat radiated by the radiating member 231 was six times greater than the amount of heat radiated by the radiating member 231 in Case A0. The amount of heat removed from the radiating member 231 by conduction and convection was decreased so that the amount of heat removal by conduction and convection in Case A1 was smaller than the amount of heat removed by the two mechanisms in Case A0. As shown, the total amount of heat radiated, conducted and convected from the radiating member 231 was about 58.04 watts in Case A1. The total amount of heat removed in the case of A1 was greater than that of the heat removed in the case of A0 by about 5.63 watts.

In Case A2, where the ceramic material was coated only on the outside surface of the receiving container 110, an amount of heat radiated by the radiating member 231 was less than the amount of heat removed from the radiating member 231 by conduction and convection. The total amount of heat removed in Case A2 was greater than the amount of heat removed in Case A1 by about 0.08 watts.

In Case A3, where the ceramic material was coated on both the inside and outside surfaces of the receiving container 110, the total amount of heat removed was greater than in Case A1. When the radiating member 231 was formed on the external electrode 230 and on a metallic member, the total amount of heat removed was further increased. In particular, the radiating member 231 was formed on the external electrode 230 and the receiving container 110 so that the total amount of heat radiated, conducted and convected from the flat fluorescent lamp 200 was further increased.

The above results indicate that it is preferable to form, the radiating member 231 directly on the external electrode 230 or in a region corresponding to the external electrode 230, so that heat generated from the external electrode 230 is effectively transferred outside of the flat fluorescent lamp 200. This effective heat transfer prevents the formation of a pinhole on the flat fluorescent lamp 200.

Figure 6:
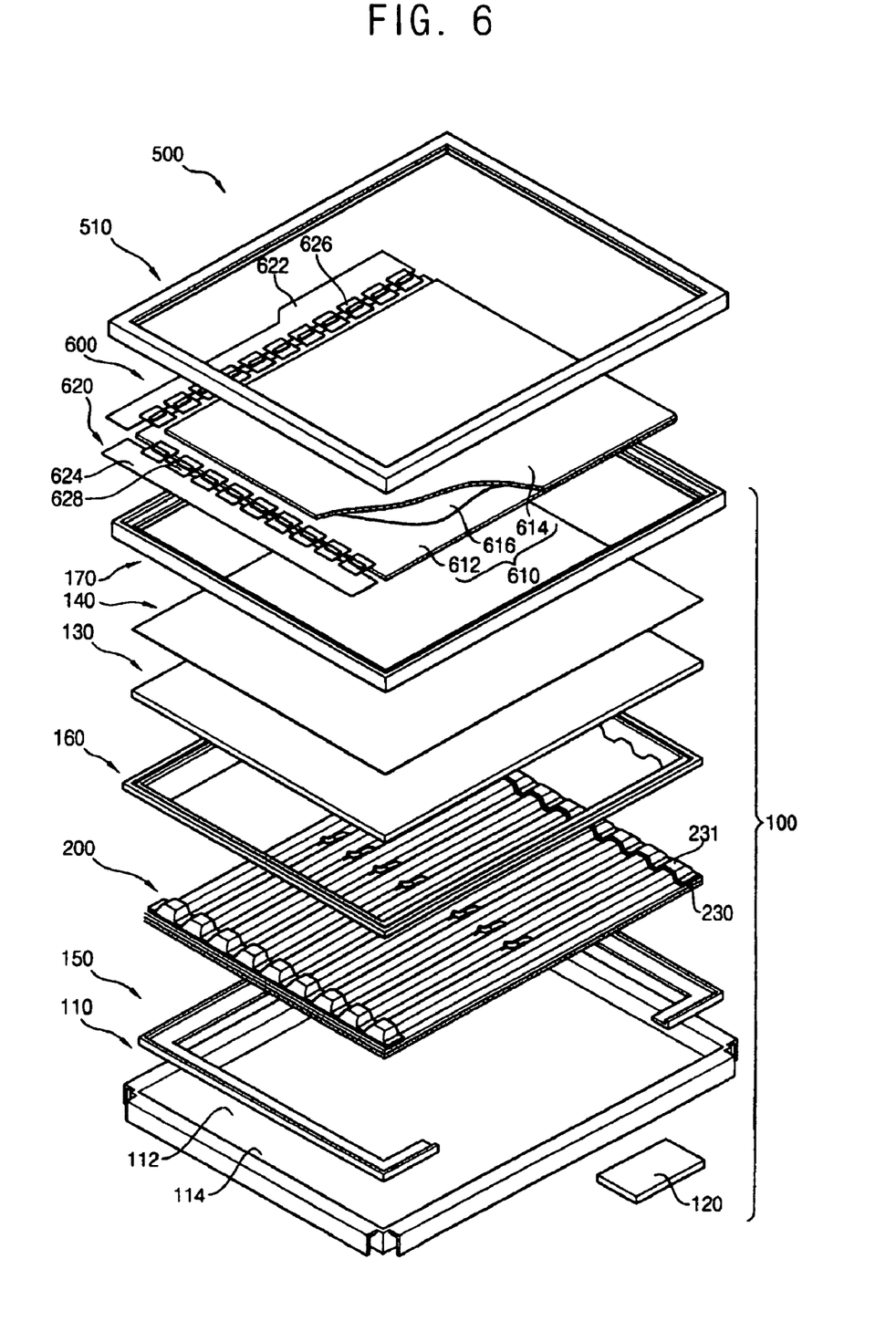
FIG. 6 is an exploded perspective view illustrating a liquid crystal display (LCD) device according to an embodiment of the present invention.

FIG. 6 is an exploded perspective view illustrating a liquid crystal display (LCD) device according to an embodiment of the present invention Referring to FIG. 6, an LCD device 500 includes a backlight assembly 100 and a display unit 600. The backlight assembly 100 generates light. The display unit 600 displays an image using the light generated from the backlight assembly 100.

The backlight assembly 100 of FIG. 6 is substantially the same as in FIGS. 1 to 5. Thus, the same reference numerals will be used to refer to the same or like parts as those described in FIGS. 1 to 5 and any redundant explanations concerning these elements will be omitted.

The display unit 600 includes an LCD panel 610 and a driving circuit part 620. The LCD panel 610 displays images using the light generated from the backlight assembly 100. The driving circuit part 620 generates driving signals to drive the LCD panel 610.

The LCD panel 610 includes a first substrate 612, a second substrate 614 facing the first substrate 612, and a liquid crystal layer 616 interposed between the first substrate 612 and the second substrate 614.

The first substrate 612 is a thin-film transistor (TFT) substrate including a plurality of TFTs arranged in a matrix configuration. The TFTs are switching elements. A source electrode and a gate electrode of each of the TFTs are electrically connected to a data line and a gate line, respectively, and a drain electrode is electrically connected to a pixel electrode. The pixel electrode includes a transparent and conductive material.

The second substrate 614 is a color filter substrate including red (R), green (G) and blue (B) pixels to display colors. The second substrate 614 may further include a common electrode including a transparent and conductive material.

When electrical power is applied to the gate electrode of each of the TFTs of the LCD panel 610, the TFT is turned on so that an electric field is generated between the pixel electrode and the common electrode. Liquid crystal molecules vary their arrangement in response to the electric field applied thereto, and thus light transmittance through the liquid crystal layer is changed. By changing the light transmittance, an image having a predetermined gray-scale is displayed.

The driving circuit part 620 includes a data printed circuit board (PCB) 622 providing the LCD panel 610 with a data driving signal, a gate PCB 624 providing the LCD panel 610 with a gate driving signal, a data driving circuit film 626 electrically connecting the data PCB 622 to the LCD panel 610, and a gate driving circuit film 628 electrically connecting the gate PCB 624 to the LCD panel 610.

Each of the data driving circuit film 626 and the gate driving circuit film 628 includes, for example, a tape carrier package (TCP) or chip-on-film (COF). Alternatively, the LCD panel 610 and the gate driving circuit film 628 include additional signal wirings so that the gate PCB 624 may be omitted, if desired.

The LCD device 500 may further include a top chassis 510 to fix the display unit 600 to the backlight assembly 100. The top chassis 510 is connected to the receiving container 110 to fix the peripheral portion of the LCD panel 610. Then, the data PCB 622 is bent toward a rear surface of the receiving container 110 such that the data driving circuit film 626 is folded over a side surface of the receiving container 110 by and the data PCB 622 may be fixed to the rear surface of the receiving container 110. The top chassis 510 includes, for example, a metal that has high mechanical strength and is resistant to deformation.

According to the above-mentioned backlight assembly and the LCD device having the backlight assembly, the heat generated from a flat fluorescent lamp is radiated outside the flat fluorescent lamp through the radiating member to reduce pinhole formation, thereby improving optical characteristics of the flat fluorescent lamp.

Having described embodiments in accordance with the present invention and their advantages, it is noted that various changes, substitutions and alterations can be made thereto without departing from the spirit and scope of the here disclosed invention.

What is claimed is:

1. A flat fluorescent lamp comprising:
   a first substrate;
   a second substrate combined with the first substrate to form a plurality of elongated and substantially parallel discharge spaces internally between the first substrate and the second substrate, where the discharge spaces are filled with at least one gas that emits radiation when excited by high voltage electrical energy;
   at least a first electrically conductive external electrode formed on at least one external surface of the first substrate and the second substrate, the first external electrode extending in a direction that is substantially perpendicular to the lengths of the internal discharge spaces, and the first external electrode being disposed to supply said high voltage electrical energy to the at least one gas; and
   a first electrically insulative heat radiating member formed on the first external electrode and constituted to radiate away heat energy coupled to the first heat radiating member from the external electrode.

2. The flat fluorescent lamp of claim 1, wherein the first radiating member comprises a ceramic material having a sufficiently high thermal emissivity to reduce an operating temperature of the first external electrode.

3. The flat fluorescent lamp of claim 2, wherein the first radiating member contacts the first external electrode.

4. The flat fluorescent lamp of claim 3, wherein the first radiating member is formed to coat at least a portion of the first external electrode.

5. The flat fluorescent lamp of claim 1, wherein the second substrate comprises:
   a plurality of discharge space defining portions spaced apart from the first substrate to thereby define elevated second substrate portions of the plural discharge spaces;
   a plurality of space-dividing portions making contact with the first substrate between the elevated discharge space defining portions, the space-dividing portions being positioned between the discharge space defining portions; and
   a sealing portion at a peripheral portion of the second substrate.

6. A backlight assembly comprising:
   a receiving container;
   a flat fluorescent lamp in the receiving container, the flat fluorescent lamp including a plurality of discharge spaces containing at least one gas that emits radiation when excited by high voltage electrical energy, the flat fluorescent lamp further having external electrodes disposed to couple high voltage electrical energy into the discharge spaces and the flat fluorescent lamp further having a light emitting area from where light is generated; and
   a heat radiating layer formed between the flat fluorescent lamp and the receiving container to radiate heat generated by the flat fluorescent lamp away from the flat fluorescent lamp.

7. The backlight assembly of claim 6, wherein the flat fluorescent lamp includes:
   a first substrate;
   a second substrate combined with the first substrate and shaped to form said plurality of discharge spaces as elongated spaces between the first substrate and the second substrate; and
   wherein at least a first of the external electrodes is formed on at least one surface of the first substrate and the second substrate, the first external electrode extending in a direction that is perpendicular to the length of the discharge spaces.

8. The backlight assembly of claim 7, wherein the second substrate comprises:
   a plurality of discharge space defining portions spaced apart from the first substrate to thereby define elevated second substrate portions of the plural discharge spaces;
   a plurality of space-dividing portions making contact with the first substrate between the elevated discharge space defining portions, the space-dividing portions being positioned between the discharge space defining portions; and
   a sealing portion at a peripheral portion of the second substrate.

9. The backlight assembly of claim 6, further comprising a power supply part that supplies the flat fluorescent lamp with *said high voltage electrical energy.

10. The backlight assembly of claim 9, further comprising:
    a diffusing plate disposed on the flat fluorescent lamp to diffuse light generated from the flat fluorescent lamp; and
    optical sheets disposed on the diffusing plate.

11. The backlight assembly of claim 10, further comprising:
    a buffer member disposed between the flat fluorescent lamp and the receiving container to support a peripheral portion of the flat fluorescent lamp;
    a first mold covering an electrode portion of the flat fluorescent lamp to fix the flat fluorescent lamp to the receiving container; and a second mold on the first mold to fix a peripheral portion of the diffusing plate and the optical sheets to the first mold.

12. The backlight assembly of claim 6, wherein the radiating layer comprises a ceramic material having a sufficiently high thermal emissivity to reduce an operating temperature of the external electrodes.

13. The backlight assembly of claim 12, wherein the radiating layer contacts at least one of the external electrodes.

14. A liquid crystal display device comprising:
a backlight assembly generating light, the backlight assembly including:
a receiving container;
a flat fluorescent lamp in the receiving container, the flat fluorescent lamp including a plurality of discharge spaces containing at least one gas that emits radiation when excited by high voltage electrical energy, the flat fluorescent lamp further having external electrodes disposed to couple high voltage electrical energy into the discharge spaces and the flat fluorescent lamp further having a light emitting area from where light is generated; and
a heat radiating layer formed between the flat fluorescent lamp and the receiving container to radiate heat generated by the flat fluorescent lamp away from the flat fluorescent lamp; and
a display unit including:
a liquid crystal display panel capable of displaying an image using the light generated from the backlight assembly; and
a driving circuit part that is coupled to drive the liquid crystal display panel.

15. The liquid crystal display device of claim 14, wherein the backlight assembly further comprises:
a power supply part that supplies the flat fluorescent lamp with electrical power;
a diffusing plate on the flat fluorescent lamp to diffuse the light generated from the flat fluorescent lamp; and
optical sheets on the diffusing plate.

16. The liquid crystal display device of claim 14, wherein the radiating layer comprises a ceramic material having a sufficiently high thermal emissivity to reduce an operating temperature of at least one of the external electrodes.

17. The liquid crystal display device of claim 16, wherein the radiating layer contacts at least one of the external electrodes of the flat fluorescent lamp.

18. The liquid crystal display device of claim 17, wherein the radiating layer is formed on a portion of at least one of the external electrodes.

* * * * *